United States Patent
Pitz et al.

(10) Patent No.: US 10,102,537 B2
(45) Date of Patent: Oct. 16, 2018

(54) METHODS, SYSTEMS AND COMPUTER READABLE MEDIA FOR UTILIZING PAYMENT CARD TRANSACTION DATA TO CONDUCT PRODUCT PRICE COMPARISONS

(71) Applicant: MasterCard International Incorporated, Purchase, NY (US)

(72) Inventors: Cindi Pitz, Stormville, NY (US); Roopa A. Vaidya, Elmsford, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/467,790

(22) Filed: Aug. 25, 2014

(65) Prior Publication Data
US 2016/0055502 A1    Feb. 25, 2016

(51) Int. Cl.
*G06Q 30/02* (2012.01)
*G06Q 20/34* (2012.01)

(52) U.S. Cl.
CPC ......... *G06Q 30/0205* (2013.01); *G06Q 20/34* (2013.01); *G06Q 30/0206* (2013.01)

(58) Field of Classification Search
CPC ............... G06Q 30/02; G06Q 30/0601; G06Q 30/0641; G06Q 20/3276; G06Q 30/0261; G06Q 30/0643
See application file for complete search history.

(56) References Cited

U.S. PATENT DOCUMENTS

| | | | |
|---|---|---|---|
| 6,292,786 B1* | 9/2001 | Deaton et al. | 705/14.25 |
| 7,386,487 B2* | 6/2008 | Leggett | G06Q 30/00 705/26.64 |
| 7,756,757 B1* | 7/2010 | Oakes, III | 705/26.1 |
| 8,209,229 B1* | 6/2012 | Weiss | G06Q 30/0283 705/26.1 |
| 8,756,154 B2* | 6/2014 | Fitzpatrick | G06Q 30/02 705/20 |
| 2005/0055281 A1* | 3/2005 | Williams | 705/26 |
| 2008/0215455 A1 | 9/2008 | Leggett et al. | |

(Continued)

OTHER PUBLICATIONS

Notification of Transmittal of the International Search Report and the Written Opinion of the International Searching Authority, or the Declaration for International Application No. PCT/US2015/045162 (dated Oct. 23, 2015).

*Primary Examiner* — Christopher Stanford
(74) *Attorney, Agent, or Firm* — Jenkins, Wilson, Taylor & Hunt, P.A.

(57) ABSTRACT

Methods, systems, and computer readable media for utilizing payment card transaction data to conduct product price comparisons are disclosed. In one example, the method includes receiving product selection information associated with a designated product from a user selection device and receiving geographic location information associated with the user selection device. The method also utilizing the product selection information and the geographic location information to identify merchant entities that have conducted sales transactions of the designated product within an area specified by the geographic location information and providing, to the user selection device, merchant comparison data that includes the identified merchant entities and the sales transaction prices of the designated product.

20 Claims, 3 Drawing Sheets

(56) References Cited

U.S. PATENT DOCUMENTS

| | | | |
|---|---|---|---|
| 2010/0121775 A1* | 5/2010 | Keener, Jr. | G06Q 30/0282 |
| | | | 705/347 |
| 2011/0016020 A1 | 1/2011 | Emigh | |
| 2012/0316989 A1 | 12/2012 | Wong et al. | |
| 2013/0290145 A1 | 10/2013 | Durst, Jr. | |
| 2014/0180874 A1 | 6/2014 | Zhao | |

* cited by examiner

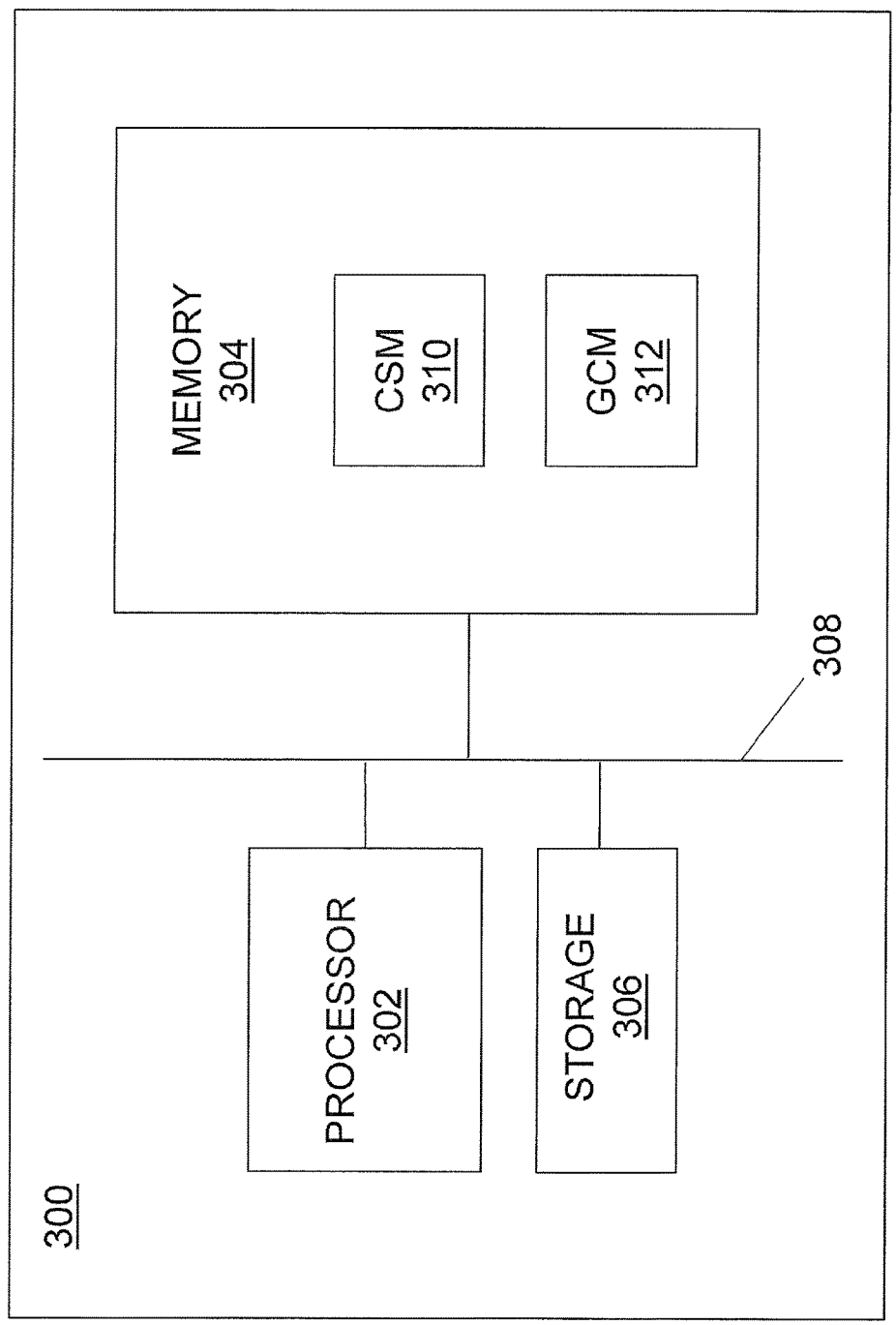

METHODS, SYSTEMS AND COMPUTER READABLE MEDIA FOR UTILIZING PAYMENT CARD TRANSACTION DATA TO CONDUCT PRODUCT PRICE COMPARISONS

TECHNICAL FIELD

The subject matter described herein relates to the use of payment card transaction information to comparison shop in a designated geographic region or area. More particularly, the subject matter described herein relates to systems, methods, and computer readable media for utilizing payment card transaction data to conduct product price comparisons.

BACKGROUND

At present, consumers typically spend a significant amount of time researching an expensive product, such as a new television, camera, smartphone, or computer, prior to conducting an actual purchase. For example, some consumers are compelled to research all of the different brands, models, specifications, and reviews associated with a desired product prior to arriving at a purchase decision. Moreover, even after a specific product is finally selected, a consumer may subsequently spend additional time comparison shopping in order to acquire the selected product at the best available price. However, such comparison shopping may only present a consumer with prices currently advertised by merchants and fails to provide the consumer with actual prices of product sales conducted in the consumer's local area.

Accordingly, there exists a need for improved systems, methods, and computer readable media for utilizing payment card transaction data to conduct product price comparisons.

SUMMARY

According to one aspect, the subject matter described herein relates to, methods, systems, and computer readable media for utilizing payment card transaction data to conduct product price comparisons. In one embodiment, the method includes receiving product selection information associated with a designated product from a user selection device and receiving geographic location information associated with the user selection device. The method also utilizing the product selection information and the geographic location information to identify merchant entities that have conducted sales transactions of the designated product within an area specified by the geographic location information and providing, to the user selection device, merchant comparison data that includes the identified merchant entities and the sales transaction prices of the designated product.

The subject matter described herein may be implemented in hardware, software, firmware, or any combination thereof. As such, the terms "function", "node", "unit", or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 3 is a high level block diagram of a general purpose computer system suitable for use in conducting product price comparisons using payment card transaction data according to an embodiment of the subject matter described herein.

DETAILED DESCRIPTION

In accordance with the subject matter disclosed herein, methods, systems, and computer readable media for utilizing payment card transaction data to conduct product price comparisons are disclosed. As used herein, payment card transaction data may include consumer card transaction data (e.g., credit card transaction data and prepaid card transaction data), debit card transaction data, corporate card transaction data, and the like. The present subject matter may be utilized to enhance aspects of comparison shopping by allowing consumers to determine where a desired product (e.g., a good, a service, a commodity, etc.) has been purchased in a specified time period as well as the sales transaction price that the desired product was purchased. In some embodiments, the present subject matter may be embodied as a website or a software application (e.g., a mobile phone application) that can be implemented and/or accessed on a user selection device, such as a desktop computer, a laptop computer, a tablet computer, a mobile smartphone, or the like. Notably, a consumer user may utilize a graphical user interface (GUI) supported by the software application in order to select the desired product being considered for purchase. A processing server in communication with the user selection device may be configured to utilize product selection information provided by the consumer user along with previously stored purchase transaction data to obtain associated merchant entity information and product sales information. Ultimately, the consumer user may be provided with all of the different merchant entity locations where the desired product has been sold during the specified time period. More specifically, the provided results may also be limited to an area defined by the user's current geographic location and a selected radius (e.g., representing a distance the user is willing to travel to purchase the desired product).

Figure 1:
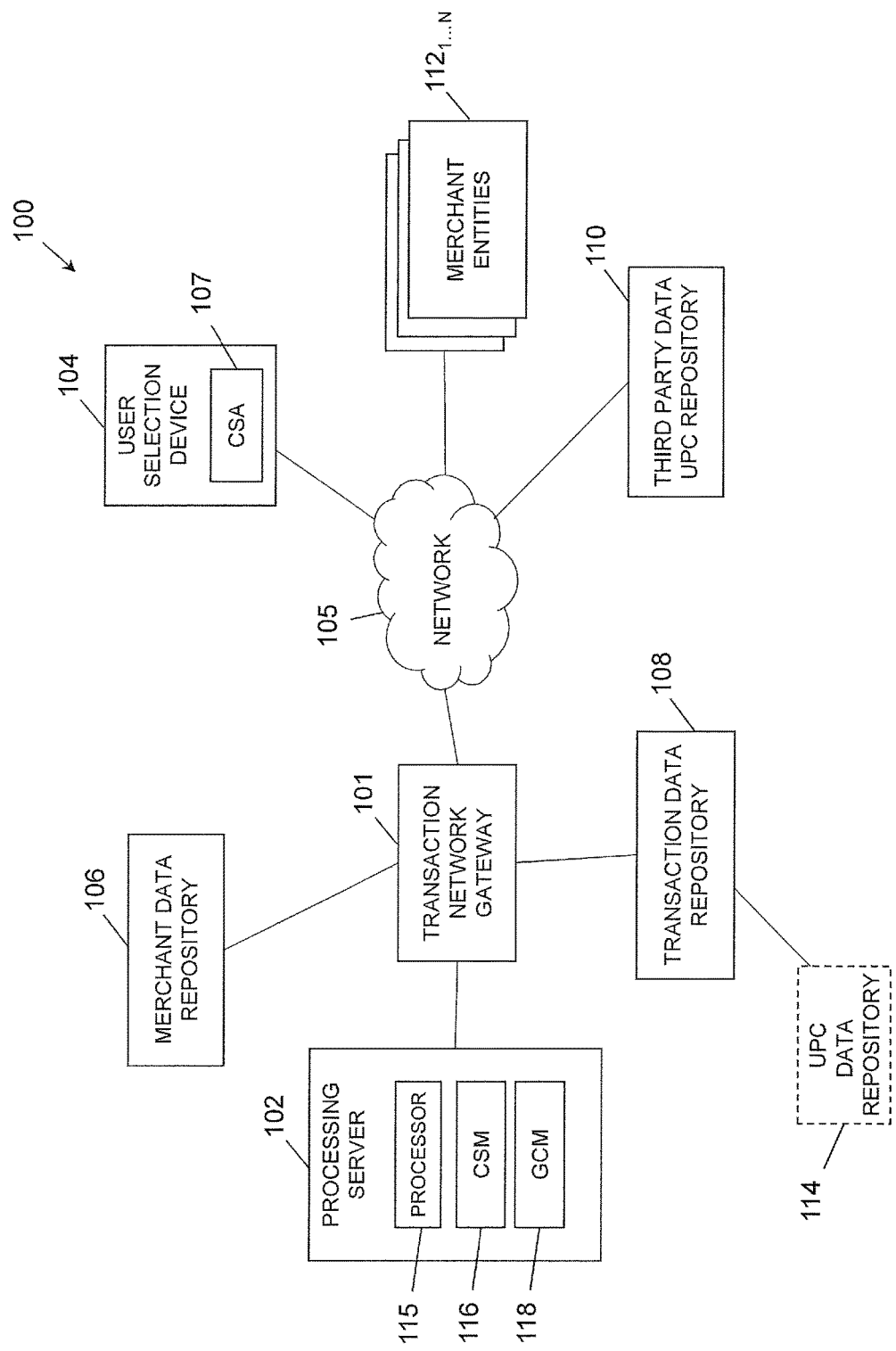
FIG. 1 is a block diagram illustrating an exemplary system for utilizing payment card transaction data to conduct product price comparisons according to an embodiment of the subject matter described herein.

FIG. 1 illustrates an exemplary system 100 for utilizing payment card transaction data to conduct product price comparisons according to an embodiment of the subject matter described herein. For example, system 100 may include a transaction network gateway 101, a processing server 102, a user selection device 104, a communications network 105 (e.g., the Internet), a merchant data repository 106, a payment card transaction data repository 108, a third party universal product code (UPC) data warehouse 110, and a plurality of merchant entities 112$_1$...$_N$. In some embodiments, system 100 may optionally include a local UPC data repository 114.

In some embodiments, processing server 102 may be communicatively connected to both payment card transaction data repository 108 and merchant data repository 106. Although FIG. 1 depicts these network elements connected via transaction network gateway 101, processing server 102, payment card transaction data repository 108, and merchant data repository 106 may be connected to each other within a payment network (e.g., communicate via intra-payment network channels) without having to communicate via transaction network gateway 101 without departing from the scope of the disclosed subject matter. Notably, processing server 102 can be configured to obtain payment card transaction records and merchant data records from payment card transaction data repository 108 and merchant data repository 106, respectively (see details below). In some embodiments, processing server 102 may include a processor 115, such as a microprocessor, central processing unit (CPU), or any other like hardware based processor unit that is configured to execute and/or utilize a comparison shopping module 116 and a geocoding module 118 in processing server 102. Each of the modules 116 and 118 may be stored in local memory (not shown), such as random access memory (RAM), read only memory (ROM), optical read/write memory, cache memory, magnetic read/write memory, flash memory, and the like. In some embodiments, geocoding module 118 may include any geocoding software application, including a third party software application such as 'Spectrum' by Pitney Bowes Software, MapMarket, or the like.

Processing server 102 may also be configured to receive selection information (e.g., a UPC or product description) for a product that the consumer user is considering to purchase from user selection device 104. In some embodiments, user selection device 104 may comprise a mobile device (e.g., a mobile smartphone device, a tablet computer, and the like) that is configured to support a comparison shopping application 107 that enables a user (e.g., via a GUI) to provide product selection information identifying a product being considered for purchase to processing server 102. For example, the mobile device may be equipped with a camera function that is configured to provide comparison shopping application 107 with a captured image of a desired product's UPC. In some embodiments, comparison shopping application 107 may be configured to send the UPC information (e.g., image or encoded information) to processing server 102. Alternatively, the mobile device's GUI may be used to provide the manual input of a UPC number, a stock keeping unit (SKU) identifier, or even a general product description of the selected product to comparison shopping application 107. For example, a user may utilize the GUI to select a product category associated with the desired product (e.g., men's shoes) and use menu filters to "drill down" to a specific product. In another embodiment, user selection device 104 may enable a user to type and/or key a description of the desired product. After receiving the desired product information (e.g., UPC), comparison shopping application 107 may be configured to send this product selection information to processing server 102.

Alternatively, user selection device 104 may comprise a personal computer (PC) that is configured to display a GUI of a comparison shopping website hosted by processing server 102 (e.g., a website supported by comparison shopping module 116). In some embodiments, the GUI of the comparison shopping website may be configured to receive the user's manual input of a UPC, SKU identifier, or the general product description of the selected product in a manner similar to that described above. Upon receiving the product selection information, processing server 102 may be configured to process the data in a manner described below.

In some embodiments, user selection device 104 may also be configured with one or more functions that enable a user to provide geographic location information to processing server 102. For example, user selection device 104 may include a mobile device that is equipped with a global positioning system (GPS) chipset that enables the mobile device to receive GPS signals and determine its own current geographic location. Alternatively, user selection device 104 (e.g., either a mobile device or personal computer) may include a GUI that is configured to receive geographic location information input directly from a user. For example, the GUI may be configured to receive a zip code, an area code, a city/town name, a county name, an address, or the like. In some embodiments, the GUI may be configured to receive latitude and longitude values and/or GPS coordinates as an input (e.g., if user selection device 104 is not equipped with a GPS chipset). In some embodiments, the GUI may be configured to receive geographic location information from a user indicating a location that the user is not currently located at (e.g., a location in which the user will be visiting).

In some embodiments, upon receiving the product selection data (e.g., a scanned/entered UPC), processing server 102 may communicate with third party UPC data warehouse 110 (which may be hosted by one or more hardware based applications computer servers) to obtain preliminary product information for display on device 104. For example, processing server 102 may be configured to use a UPC to query UPC data warehouse 110 to access the associated product information. UPC data warehouse 110 may include database entries that map UPCs to specific product information, such as a product image file, the name of the manufacturer, the manufacturer retail price, and the like. If processing server 102 is not initially provided with a UPC from user selection device 104, processing server 102 may also be configured to use the product description and/or keywords to determine a UPC corresponding to the user selected product. In such embodiments, processing server 102 may then utilize the determined UPC to access the product information from UPC data warehouse 110 as previously described.

After obtaining the product information from UPC data warehouse 110, processing server 102 may send the acquired product information to user selection device 104 for display. For example, user selection device 104 may be configured to display the product image, the manufacturer name, and the manufacturer's retail price via the GUI supported by user selection device 104.

In addition to displaying product information, user selection device 104 may be prompted to generate a notification message querying the device user to provide geographic location information. For example, user selection device 104 may prompt the user to provide a current location, such as entering an address or zip code. In some embodiments, the requested geographic location information may further include a designated distance and/or area. For example, user selection device 104 can receive, as input from the user, a defined distance (e.g., miles or kilometers). In some embodiments, the defined distance may represent the distance (e.g., miles) the user is willing to travel to purchase and/or pick up the desired product (e.g., 10 mile radius from user or designated location point). Upon receiving the user's geographical location information input, user selection device 104 subsequently forwards the data to processing server 102.

In some embodiments, processing server 102 may be further configured to consider time period information (e.g., a time frame to consider the past sales transactions) that is provided by user selection device 104. Alternatively, the time period information may include a parameter or value that is stored locally at processing server 102 and/or comparison shopping module 116 as a default time value. In some embodiments, the time period designated by the user (or by a default value) may be based on any number of factors or considerations, such as seasonal changes, trends, user's preferences, and the like. Notably, processing server 102 may be configured to only search and/or access past sales transaction information that comports with a specific time period (e.g., sales conducted in the last 2 months).

After receiving both the product selection information (e.g., a UPC) and the geographic location information from user selection device 104, processing server 102 may utilize the provided UPC to query transaction data repository 108 or data warehouse (e.g., which may be hosted by one or more hardware-based applications computer servers) to identify the merchant entities that have conducted a sales transaction for the designated product associated with the aforementioned UPC. In some embodiments, payment card transaction data repository 108 may include a computer server hosting a MasterCard payment card transaction database that records the payment card transactions conducted by MasterCard credit card, debit card, corporate card, or prepaid card users at merchant locations. However, the disclosed subject matter is not limited to the use of MasterCard payment card transaction data, and thus payment card transaction data and/or consumer card transaction information from other sources may be utilized without departing from the scope of the present subject matter.

In some embodiments, transaction data repository 108 may be configured to store a plurality of payment card transaction data record entries. For example each transaction data record stored in repository 108 may include (and be organized by) a cardholder account number, a payment transaction date/time, a merchant entity identifier, a total payment transaction amount, and/or a payment transaction identifier. In some embodiments, transaction data repository 108 may be configured to comprise transaction data record entries that include one or more fields containing UPC data and the sale price of the products purchased in the purchase transaction.

In alternate embodiments, the UPC data and corresponding sales price for each of the products purchased in the payment transaction may be contained in a local UPC data repository 114. In some embodiments, UPC data repository 114 may contain data entries, each of which comprises a payment transaction identifier that is mapped to a UPC and the sales price of the item associated with the UPC. In some embodiments, a plurality of UPCs may be grouped in a single data record entry that is associated with a common payment transaction identifier. In the event UPC data repository 114 is utilized, processing server 102 may be configured to utilize the UPC received from user selection device 102 to access UPC data repository 114 to find one or more matching UPCs as well as locating a corresponding payment transaction identifier. Processing server 102 may then utilize the retrieved payment transaction identifier(s) to access transaction network gateway 101 to locate the corresponding merchant entity identifiers (i.e., the merchants that conducted the actual sale of the designated product).

In some embodiments, payment card transaction data repository 108 may include one or more computer servers hosting databases configured for storing processed payment card transaction data records (e.g., actual payment card transaction data associated with a consumer) that are obtained from one or more of merchant entities $112_1 \ldots _N$. In some embodiments, each of merchant entities $112_1 \ldots _N$ may represent one or more computer devices or servers that are utilized by a merchant entity (e.g., a merchant company, a corporation, etc.) to record, compile, manage, process, and store payment card transaction data corresponding to payment card transactions conducted at any of the merchant entity's store locations. In some embodiments, a merchant entity 112 may also include a terminal device (e.g., a cash register, a credit card reader, a wireless device reader, etc.) that can be located and utilized at a particular point of sale (PoS) location associated with the merchant entity. Regardless of the type of device, each of merchant entities $112_1 \ldots _N$ can be configured to supply payment card transaction data to payment card transaction data repository 108 on a periodic basis or at the discretion of a system administrator. In addition, merchant entities $112_1 \ldots _N$ may also be configured to provide captured UPC data to data repository 108. In some embodiments, a merchant entity 108 may utilize equipment at the point of sale that scans and/or captures the UPC data from a product being purchased. The UPC and sales price may be initially stored in a merchant store database (not shown) associated with merchant entity 112 and subsequently provided to processing server 102 and/or transaction data repository 108 via transaction network gateway 101. Alternatively, the UPC and sales price may be encoded in a payment authorization request message that is sent to the appropriate issuer entity (e.g., a bank that issued the payment card). Such a payment authorization request message is typically sent to the issuer entity via transaction network gateway 101, which may be configured to extract the UPC data (and related sales price information) from the message. The extracted UPC data may then be stored in transaction data repository 108 or UPC data repository 114 by processing server 102 (and/or transaction network gateway 101).

In some embodiments, merchant data repository 106 may be configured to store merchant data records that include information corresponding to merchant entities that accept payment transaction cards associated with a particular payment card system (e.g., MasterCard). For example, merchant data repository 106 may include merchant data record entries that contain merchant entity identifiers/names that are mapped to merchant entity data, such as merchant entity location information (e.g., address or GPS coordinates), merchant entity phone numbers, merchant email addresses, merchant entity website addresses, and the like. In some embodiments, merchant data repository 106 may be configured to include merchant information for each specific store location associated with a single merchant entity (e.g., merchant store data for each separate Target store location).

In some embodiments, processing server 102 may utilize comparison shopping module 116 to select one or more of the data fields included in a payment card transaction data record entry (i.e., in transaction data repository 108) to access merchant data repository 106. For example, processing server 102 may utilize a merchant store/entity identifier to query and/or access merchant data repository 106. Notably, the merchant store identifier may be used to cross-reference the entries of merchant data repository 106 that include merchant location information. In some embodiments, if multiple transactions pertaining to the same merchant entity and/or store (i.e., for the same product) are identified by processing server 102, comparison shopping module 116 may be further configured to only select and/or utilize information included in the most recent payment card transaction data record (i.e., such that user selection device 104 will ultimately be provided with merchant comparison data that includes the most recent information related to a particular merchant entity/store) to access merchant data repository 106. In other embodiments, comparison shopping module 116 may be configured to utilize all of the identified payment card transaction data records associated with a single merchant entity and/or store to access merchant data repository 106.

In the event processing server 102 successfully finds a matching entry in merchant data repository 106, processing server 102 is able to acquire the geographic location information corresponding to the merchant entity identifiers of interest (e.g., merchant entities that have sold the designated product) for additional processing. In some embodiments, processing server 102 may be optionally configured to preprocess the data obtained from merchant data repository 106. For example, after receiving the data from repository 106, comparison shopping module 116 of processing server 102 may be configured to perform a merchant data quality check in order determine if any of the merchant data is invalid or missing. With respect to the former, processing server 102 may be configured to remove the invalid data. Similarly, comparison shopping module 116 of processing server 102 may be configured with a de-duplication component (not shown) that serves as a filter to remove any duplicate data records. In addition, comparison shopping module 116 may be configured with a cleansing component (not shown) that may be configured to identify invalid characters or any other unrecognizable data.

After conducting the optional preprocessing described above, comparison shopping module 116 may utilize the location information obtained from repository 106 and the geographic location parameter information (and specified time period, if applicable) received from user selection device 104 to determine which merchant entities satisfy the established qualification/filter conditions (e.g., merchant entities located in the designated geographic area that have sold the designated product in the specified time period). In some embodiments, processing server 102 may include a geocoding module 118 that is used to plot merchant entities on a map to be displayed on user selection device 104. Geocoding module 118 may also be configured to convert an inputted address into latitude and longitude coordinates (e.g., GPS coordinates) to be used to establish a geographic location area. For example, geocoding module 118 may be configured to receive one or more of the merchant addresses (or GPS coordinates) obtained from merchant data repository 106, convert each merchant entity address into a latitude and longitude coordinate set, and plot each coordinate set on a map in relation to the user's position or a location designated by the user via user selection device 104. Notably, geocoding module 118 may be configured to only plot the merchant addresses that comply with the defined distance information previously designated by the user.

After identifying all of the merchant entities that satisfy the filter requirements (e.g., merchants that have sold the identified product within the designated area in the specified time period) provided by user selection device 104, processing server 102 may generate merchant comparison data that includes a list of the identified merchant entities and associated information. For example, processing server 102 may generate a listing that includes for each identified merchant entity, a merchant name, a merchant address and/or location, a merchant phone number, a product description, and a product sales price (i.e., purchased price). In some embodiments, processing server 102 may utilize a merchant identifier included in a payment card transaction data record entry in order to query merchant data repository 106 to obtain merchant entity information to identify merchant entities that comply with the constraints of the query (e.g., all sales of a product associated with a particular UPC conducted during a specified time period with merchant entities located in a defined area). After identifying the merchant entities, processing server 102 may generate a listing of the names and contact information of the identified merchant entities as well as their actual sale price information associated with the designated product. More specifically, after generating the merchant comparison data (e.g., the listing of merchant entities that have sold the designated product along with associated product sales price information and the aforementioned geographical location information), processing server 102 may be configured to provide the generated merchant comparison data to user selection device 104. In some embodiments, processing server 102 may provide the merchant comparison data to user selection device 104 via network 105 (e.g., an IP network and/or a cellular network) using web services or Extensible Markup Language (XML). In some embodiments, processing server 102 may send the generated listing to user selection device 104, which may utilize a GUI to display the merchant comparison data to the user.

In some embodiments, the user may utilize the GUI of user selection device 104 to select one of the listed merchant entities. Such a selection may trigger user selection device 104 to contact the selected merchant entity, obtain directions to the merchant entity location, and/or obtain more information (e.g., current deals, coupons, discounts, etc.) regarding the selected product. In some embodiments, the selection of a merchant entity via user selection device 104 may also trigger a product stock request (e.g., a message inquiring whether or not the selected product is in stock) to be sent to the selected merchant entity.

Figure 2:
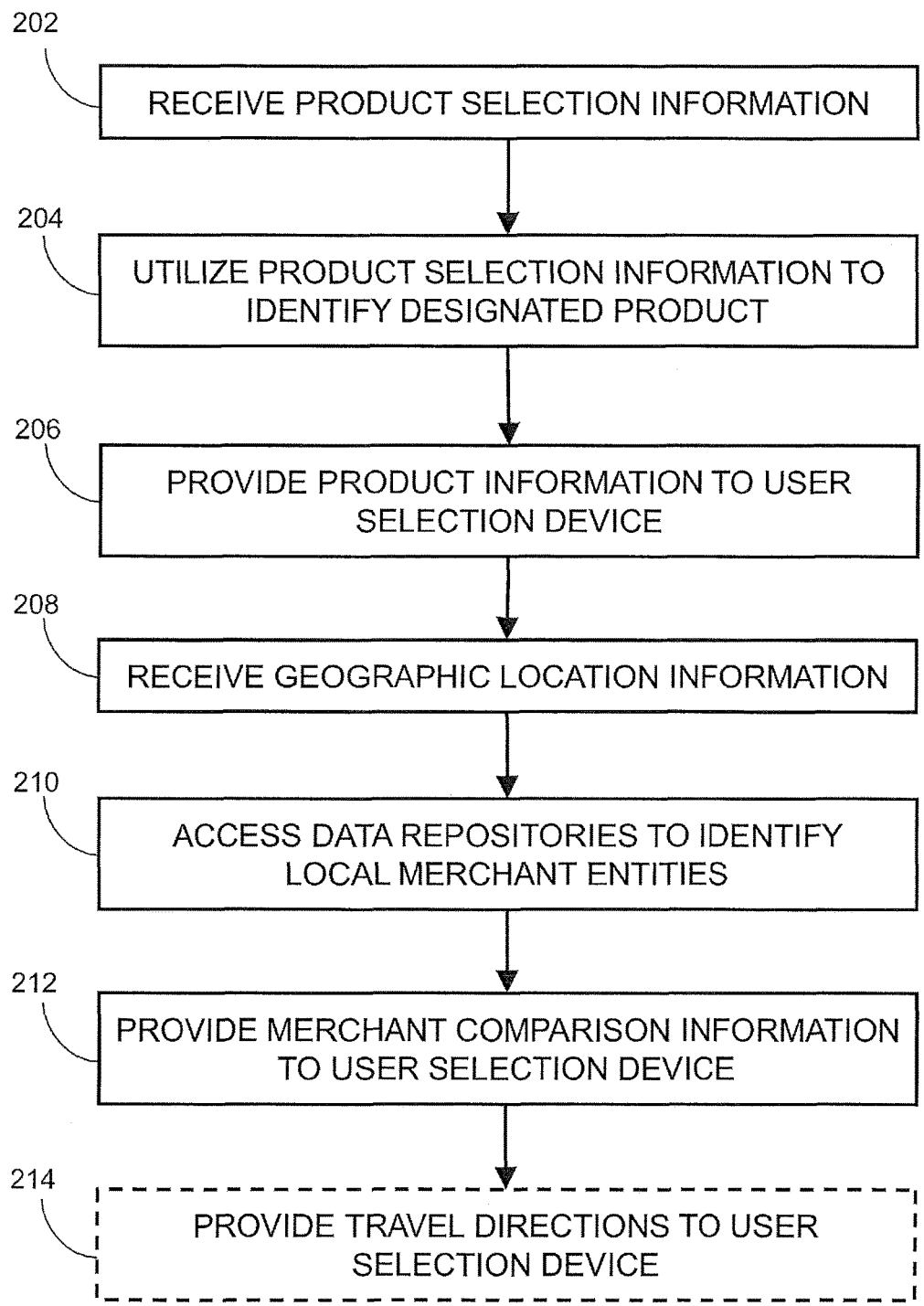
FIG. 2 is a flow chart illustrating an exemplary process for utilizing payment card transaction data to conduct product price comparisons according to an embodiment of the subject matter described herein.

FIG. 2 is a flow chart illustrating an exemplary method 200 for utilizing payment card transaction data to conduct product price comparisons according to an embodiment of the subject matter described herein. Although exemplary method 200 utilizes credit card transaction data, any type of payment card transaction data may be utilized without departing from the scope of the present subject matter.

In step 202, product selection information associated with a product designated by a user is received. In some embodiments, a consumer user may utilize a UI on user selection device 104 to select a desired product being considered for purchase. For example, user selection device 104 may comprise a mobile device or a personal computer configured to display a UI of a mobile application or website, such as comparison shopping application 107 shown in FIG. 1. In some embodiments, a user may provide a UPC (e.g., via manual entry of UPC, an image capture of UPC, etc.) of a particular product to user selection device 104, which in turn may be configured to forward the UPC information to processing server 102. In some embodiments, the user may enter a description (e.g., via a text description or pull down menus) of the product in user selection device 104, which is subsequently provided to processing server 102.

In step 204, the product selected/designated by the user is identified. Upon receiving the UPC data from user selection device 104, processing server 102 may be configured to use the UPC data to query a third party UPC data warehouse 110 in order to obtain information associated with the product, such as an image of the product, the manufacturer of the product, and/or the manufacturer's suggested retail price. In some embodiments, processing server 102 may be configured to convert a product description received by user selection device 104 into a UPC that can be used to query UPC data repository 114 and obtain the product information as described above.

In step 206, the information received from the third party UPC data warehouse 110 may be provided to user selection device 104. In some embodiments, user selection device 104 may receive the image of the product along with data indicating the manufacturer of the product and the manufacturer's suggested retail price. User selection device 104 may also include a GUI associated with comparison shopping application 107 that is configured to support the display of this information to the user.

In step 208, geographic location information is received. In some embodiments, user selection device 104 may be configured to automatically determine (e.g., via a GPS chipset in device 104) and provide the user's geographic location to processing server 102. Such a location determination may be conducted upon receiving a location request message from processing server 102 or in response to receiving the product information from processing server 102 (e.g., in step 206). In other embodiments, user selection device 104 may display a notification that requests the user to manually enter a location identifier (e.g., an address, GPS coordinates, zip code, or the like) that specifies the area the user is presently located (or, alternatively, the area in which the user wants to consider for comparison shopping). In some embodiments, the location information may further include a specified distance measurement value (e.g., 8 mile radius) the user wishes to consider for comparison shopping (e.g., the number of miles the user is willing to travel from the user's location to purchase the desired product). After being entered in user selection device 104, the location information (e.g., user's GPS location and distance measurement data) is sent by user selection device 104 to processing server 102. At this stage, the user may also provide, via user selection device 104, a specified time frame (along with the geographical location information) that may be used by processing server 102.

In step 210, various data repositories are accessed to identify local merchant entities that have sold the designated product. In some embodiments, processing server 102 utilizes the UPC data received from user selection device 104 (e.g., see step 202) to query transaction data repository 108. For example, a UPC and a designated time period may be crossed referenced with the entries in transaction data repository 108 in order to identify all of the merchant entities that have conducted a purchase transaction for the designated product during the specified time frame. As an example, processing server 102 may utilize data including i) a specific UPC that is associated with a lamp shade product and ii) a time period of 2 months as specified by the user to cross-reference UPC data fields and purchase/sale date data fields contained in the data record entries in repository 108 in an attempt to find one or more qualified matches.

In alternative embodiments where transaction data repository 108 is not configured to contain UPC data and associated prices, processing server 102 may use the UPC to query the record entries in UPC data repository 114. As a result of the query, processing server 102 may receive, for each matching UPC found, a payment transaction identifier along with the purchase price of the item associated with the matching UPC. In some embodiments, processing server 102 may then utilize the payment transaction identifier to query transaction data repository 108. Specifically, processing server 102 may be configured to locate the entry containing the payment transaction identifier in order to obtain a corresponding merchant identifier (also contained in the repository record entry).

Regardless of the manner in which a merchant identifier corresponding to the UPC is obtained, processing server 102 can be configured to query merchant data repository 106. Upon accessing merchant data repository 106, processing server 102 may obtain address and/or GPS location information associated with each merchant identifier. Upon retrieving the merchant location information associated with each merchant entity that has conducted a sale for the designated product/UPC, processing server 102 may utilize geocoding module 118 to identify all of the merchant entities that are located within the specified area. For example, geocoding module 118 may compare the location (e.g., address or GPS coordinates) of each merchant identity with an area defined by the geographic location information obtained in step 208 in order to determine whether the merchant entity should be included in the merchant comparison data to be provided to the user selection device 104 (i.e., a merchant entity located within the designated geographic area that has sold the designated product within the defined time period).

In step 212, merchant comparison data is provided to the user selection device. In some embodiments, comparison shopping module 116 of processing server 102 provides a listing of merchant entities and associated comparison shopping information to user selection device 104. Upon receiving the merchant comparison data, user selection device 104 may be configured to display, via the UI, a listing that includes a merchant name, a merchant address, a merchant phone number, and the product price for each of the merchant entities satisfying all of the qualification conditions. As an example, the qualification conditions may be used to identify merchant entities that have sold the aforementioned lamp shade product within 8 miles of the user's location in the past 2 months as specified in steps 208 and 210. In the event that no relevant purchase transactions related to the lamp shade product have been conducted (i.e., at all and/or in accordance to the qualification conditions), then comparison shopping module 116 may be configured to send an appropriate notification message to user selection device 104 (e.g., "No results were found") for display to the user. User selection device 104 may also be configured to utilize the merchant entity contact information to send a query to the merchant entity to determine if the designated product is currently in stock, request coupons, and readily compare merchant and/or sales price information.

In some embodiments, method 200 may include an optional step 214 where travel directions associated with a selected merchant entity are provided to user selection device 104. For example, a user may utilize user selection device 104 to select one of the merchant entities identified by the comparison merchant data and send a message indicating such a selection to processing server 102. In response, comparison shopping module 116 may utilize the aforementioned merchant entity address and/or GPS information to generate travel directions (e.g., driving directions, pedestrian directions, etc.) that are subsequently sent to user selection device 104. In some embodiments, comparison shopping application 107 may process the received address and/or GPS information and display a map and/or text directions on the screen of user selection device 104 for the user's convenience. For example, the displayed travel directions may indicate directions to the selected merchant entity/store location from the current location of user selection device 104.

FIG. 3 depicts a high level block diagram of a general purpose computer system suitable for use in performing the functions described herein. As depicted in FIG. 3, system 300 comprises a processor 302, a memory 304, a storage device 306, and communicatively connected via a system bus 308. In some embodiments, processor 302 can comprise can comprise a microprocessor, central processing unit (CPU), or any other like hardware based processing unit. In some embodiments, a comparison shopping module (CSM) 310 and geocoding module (GCM) 312 can be stored in memory 304, which can comprise random access memory (RAM), read only memory (ROM), optical read/write memory, cache memory, magnetic read/write memory, flash memory, or any other non-transitory computer readable medium. In some embodiments, processor 302 and memory 304 can be used to execute and manage the operation of CSM 310 and/or GCM 312. In some embodiments, storage device 306 can comprise any storage medium or storage unit that is configured to store data accessible by processor 302 via system bus 308. Exemplary storage devices can comprise one or more local databases hosted by system 300.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for utilizing payment card transaction data to conduct product price comparisons, the method comprising:
   extracting, by a transaction network gateway, payment card transaction data from payment authorization request messages sent by identified merchant entities to issuer entities of payment cards used to conduct sales transactions;
   storing, by the transaction network gateway, the extracted payment card transaction data in a payment card transaction data repository server;
   receiving, by a processing server, product selection information associated with a designated product from a user selection device;
   receiving, by the processing server, geographic location information associated with the user selection device;
   utilizing, by the processing server, the product selection information, a specified time period designated via the user selection device, and the geographic location information to query the payment card transaction data repository server hosted by a payment card system to obtain the payment card transaction data that is stored in the payment card transaction data repository server and that identifies merchant entities that have conducted sales transactions of the designated product within an area specified by the geographic location information and during the specified time period, wherein the payment card transaction data indicates the sales transactions conducted between the merchant entities and payment card users of the payment card system and includes purchase price data of the designated product; and
   providing, to the user selection device by the processing server, merchant comparison data that is generated by the processing server using the payment card transaction data and includes the identified merchant entities and prices of the sales transactions of the designated product sold by the identified merchant entities during the specified time period.

2. The method of claim 1 wherein receiving product selection information includes receiving either a universal product code (UPC) identifier or a product description input of the designated product from the user selection device.

3. The method of claim 1 wherein receiving geographic location information includes receiving global positioning system (GPS) information from the user selection device or receiving input specifying an area identifier from the user selection device.

4. The method of claim 1 comprising sending, to the user selection device, travel directions to a selected one of the identified merchant entities from a current location of the user selection device.

5. The method of claim 1 wherein the merchant comparison data includes, for each of the identified merchant entities, at least one of a merchant name, a merchant store address, a merchant phone number, a merchant email address, a merchant website address, and a sales transaction price corresponding to the designated product.

6. The method of claim 1 comprising utilizing the product selection information to query a transaction data repository to obtain merchant identifiers corresponding to the merchant entities.

7. The method of claim 6 wherein utilizing the product selection information further comprises using the product selection information to query a local UPC data repository to obtain payment card transaction identifiers that are used to obtain the merchant identifiers in the transaction data repository.

8. The method of claim 6 comprising using the merchant identifiers to query a merchant entity database to obtain corresponding merchant location information for each of the merchant entities.

9. The method of claim 8 wherein a merchant entity is included in the merchant comparison data if the merchant location information associated with the merchant entity comports with the received geographic location information.

10. A system for utilizing payment card transaction data to conduct product price comparisons, the system comprising:
    a merchant data repository configured to store information associated with a plurality of merchant entities;
    a payment card transaction data repository server configured to store payment card transaction data;
    a transaction network gateway configured to extract payment card transaction data from payment authorization request messages sent by identified merchant entities to issuer entities of payment cards used to conduct sales transactions and to store the extracted payment card transaction data in the payment card transaction data repository server; and
    a processing server configured to:
       receive product selection information associated with a designated product from a user selection device;
       receive geographic location information associated with the user selection device;
       utilize the product selection information, a specified time period designated via the user selection device, and the geographic location information to query the payment card transaction data repository server hosted by a payment card system to obtain the payment card transaction data that is stored in the payment card transaction data repository server and that identifies merchant entities that have conducted sales transactions of the designated product within an area specified by the geographic location information and during the specified time period, wherein the payment card transaction data indicates the sales transactions conducted between the merchant entities and payment card users of the payment card system and includes purchase price data of the designated product; and provide merchant comparison data that is generated by the processing server using the payment card transaction data and includes the identified merchant entities and prices of the sales transactions of the designated product sold by the identified merchant entities during the specified time period to the user selection device.

11. The system of claim 10 wherein the processing server is further configured to receive either a universal product code (UPC) identifier or a product description input of the designated product from the user selection device.

12. The system of claim 10 wherein the processing server is further configured to receive global positioning system (GPS) information from the user selection device or receiving input specifying an area identifier from the user selection device.

13. The system of claim 10 wherein the processing server is further configured to send, to the user selection device, travel directions to a selected one of the identified merchant entities from a current location of the user selection device.

14. The system of claim 10 wherein the merchant comparison data includes, for each of the identified merchant entities, at least one of a merchant name, a merchant store address, a merchant phone number, a merchant email address, a merchant website address, and a sales transaction price corresponding to the designated product.

15. The system of claim 10 wherein the processing server is further configured to utilize the product selection information to query a transaction data repository to obtain merchant identifiers corresponding to the merchant entities.

16. The system of claim 15 wherein the processing server is further configured to use the product selection information to query a local UPC data repository to obtain payment card transaction identifiers that are used to obtain the merchant identifiers in the transaction data repository.

17. The system of claim 15 wherein the processing server is further configured to use the merchant identifiers to query a merchant entity database to obtain corresponding merchant location information for each of the merchant entities.

18. The system of claim 17 wherein a merchant entity is included in the merchant comparison data if the merchant location information associated with the merchant entity comports with the received geographic location information.

19. A non-transitory computer readable medium having stored thereon executable instructions which, when executed by a processor of a computer, cause the computer to perform steps comprising:

extracting, by a transaction network gateway, payment card transaction data from payment authorization request messages sent by identified merchant entities to issuer entities of payment cards used to conduct sales transactions;

storing, by the transaction network gateway, the extracted payment card transaction data in a payment card transaction data repository server;

receiving, by a processing server, product selection information associated with a designated product from a user selection device;

receiving, by the processing server, geographic location information associated with the user selection device;

utilizing, by the processing server, the product selection information, a specified time period designated via the user selection device, and the geographic location information to query the payment card transaction data repository server hosted by a payment card system to obtain the payment card transaction data that is stored in the payment card transaction data repository server and that identifies merchant entities that have conducted sales transactions of the designated product within an area specified by the geographic location information and during the specified time period, wherein the payment card transaction data indicates the sales transactions conducted between the merchant entities and payment card users of the payment card system and includes purchase price data of the designated product; and providing, to the user selection device by the processing server, merchant comparison data that is generated by the processing server using the payment card transaction data and includes the identified merchant entities and prices of the sales transactions of the designated product sold by the identified merchant entities during the specified time period.

20. The computer readable medium of claim 19 comprising sending, to the user selection device, travel directions to a selected one of the identified merchant entities from a current location of the user selection device.

* * * * *